3,232,999
SEPARATION OF NITROTOLUENE OR NITROBENZENE
Michael Edward Brogden, George Milnes, and Harry Pinkerton, all of Manchester, England, assignors to Imperial Chemical Industries Limited, London, England, a corporation of Great Britain
No Drawing. Filed Dec. 28, 1964, Ser. No. 421,636
Claims priority, application Great Britain, Jan. 8, 1964, 822/64
3 Claims. (Cl. 260—645)

This invention relates to the recovery of nitro compounds dissolved in the spent acid remaining after the nitration of organic compounds with mixed nitric and sulphuric acids.

According to the present invention we provide a process for the recovery of nitro compounds dissolved in the spent acid remaining after the nitration of organic compounds with mixed nitric and sulphuric acids wherein the spent acid is contacted with ethylene dichloride and/or propylene dichloride or mixture containing such solvent in major amount thereby extracting nitro compound from the spent acids.

When for example toluene is nitrated with mixed nitric and sulphuric acids to form a mixture of isomeric dinitrotoluenes the initial reaction product is a two phase mixture comprising an upper organic phase consisting of crude dinitrotoluenes and a lower phase (the spent acid) consisting mainly of sulphuric acid containing in the region 15–25% by weight of water, small amounts of by-products and 2.5% by weight or more of dissolved dinitrotoluenes. The dinitrotoluenes dissolved in the spent acid represent a substantial proportion of the yield and accordingly after the separation of the upper layer of crude dinitrotoluenes for example by decantation, it is desirable to treat the remaining spent acid layer to recover the dissolved dinitrotoluenes. Hitherto no entirely satisfactory solvent extraction process has been disclosed, but it is found that ethylene and propylene dichlorides are extremely efficient solvents which are chemically inert under normal extraction conditions and can be used very satisfactorily for the recovery of dinitrotoluenes and other nitro compounds from the spent acid.

If desired mixtures of ethylene dichloride and propylene dichlorides may be employed or mixtures of these solvents with minor amounts of other solvents such as straight chain and cyclic hydrocarbons with B.Pts. preferably in the range 0–110° C. but usually to simplify subsequent separation it is preferred to use single solvents for the extraction. The extraction can be performed at any convenient temperature up to the boiling point of the extraction solvent, temperatures of from 50° C. to 65° C. being preferred. Any conventional solvent extraction equipment can be used for extraction of the nitro compounds dissolved in the spent acid for example a Rotating Contactor.

After separation from the spent acid the solution of nitro compound in the ethylene dichloride or propylene dichloride or mixture containing either or both of these solvents may be washed with aqueous alkali and then with water to remove traces of acid. The washed solution may be separated from the wash waters in any convenient apparatus for example in a continuous decanter, and the solvent phase then passed to distillation apparatus where the solvent is removed by evaporation leaving behind the less volatile nitro compound.

Although the process of the invention is especially suitable for the recovery of dinitrotoluenes from spent acid it is also very useful for extracting other nitro compounds such as mononitrotoluenes and nitrobenzene from spent acid.

A preferred embodiment of the invention is described in the following example—

*Example*

2960 lb./hr. spent acid containing 77 lb./hr. dissolved dinitrotoluene isomers at 65° C. is fed to the top of a Rotating Disc Contactor. 346 lb./hr. propylene dichloride at 35° C. is fed to the base of the contactor. The effective height of the Rotating Disc Contactor is sufficient to give 4 theoretical extraction stages. Spent acid from the base of the Contactor contains 2 lb./hr. dinitrotoluene isomers and propylene dichloride from the top contains 75 lb./hr. dinitrotoluene isomers. After the propylene dichloride solution has been washed to remove traces of acid the dinitrotoluene isomers are recovered from the solution by distilling off the solvent.

What we claim is:
1. Process for the recovery of a nitro compound selected from the group consisting of a nitrotoluene and nitrobenzene dissolved in the spent acid remaining after nitration of an organic compound with mixed nitric and sulfuric acids comprising contacting the spent acid with a solvent for said nitro compound, said solvent being selected from the group consisting of ethylene dichloride and propylene dichloride and extracting said nitro compound from the spent acid.

2. Process according to claim 1 wherein the nitro compound is a dinitrotoluene.

3. process according to claim 1 wherein said solvent is employed in admixture with a minor amount of a member selected from the group consisting of a straight chain hydrocarbon and a cyclic hydrocarbon.

References Cited by the Examiner
UNITED STATES PATENTS
2,435,544  2/1948  Kokatnur _____ 260—645

LEON D. ROSDOL, *Primary Examiner.*

CARL D. QUARFORTH, *Examiner.*

L. A. SEBASTIAN, *Assistant Examiner.*